(12) United States Patent
Williams

(10) Patent No.: US 11,878,609 B2
(45) Date of Patent: Jan. 23, 2024

(54) CHILD SAFETY SEAT AND RELATED SPIN LOCK MECHANISM

(71) Applicant: Wonderland Switzerland AG, Steinhausen (CH)

(72) Inventor: Bruce L. Williams, Narvon, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/705,401

(22) Filed: Mar. 28, 2022

(65) Prior Publication Data

US 2022/0212575 A1 Jul. 7, 2022

Related U.S. Application Data

(63) Continuation of application No. 16/888,876, filed on Jun. 1, 2020, now Pat. No. 11,420,540.

(60) Provisional application No. 62/860,398, filed on Jun. 12, 2019.

(51) Int. Cl.
 *B60N 2/28* (2006.01)
(52) U.S. Cl.
 CPC ......... *B60N 2/2869* (2013.01); *B60N 2/2809* (2013.01); *B60N 2/2821* (2013.01); *B60N 2/2845* (2013.01)
(58) Field of Classification Search
 CPC ... B60N 2/2869; B60N 2/2809; B60N 2/2821
 See application file for complete search history.

(56) References Cited

U.S. PATENT DOCUMENTS

| 4,641,844 A | 2/1987 | Mar |
| 6,260,920 B1 | 7/2001 | Tolfsen |
| 6,520,579 B2 | 2/2003 | Kassai |

(Continued)

FOREIGN PATENT DOCUMENTS

| AU | 2016256730 A1 | 11/2016 |
| AU | 2011200416 C1 | 9/2019 |

(Continued)

OTHER PUBLICATIONS

Office action dated May 7, 2022 for CN application No. 202010532093.8, pp. 1-6.

(Continued)

*Primary Examiner* — David R Dunn
*Assistant Examiner* — Tania Abraham
(74) *Attorney, Agent, or Firm* — Winston Hsu

(57) ABSTRACT

A child safety seat includes a base, a seat body and a spin lock mechanism. The seat body is movably disposed on the base and switchable relative to the base between a forward facing position and a rearward facing position. The spin lock mechanism includes a pivoting component and a locking component. The pivoting component is pivotally connected to one of the base and the seat body. A driving slot is formed on the pivoting component. The locking component slidably passes through the driving slot for engaging with and disengaging from the other of the base and the seat body. The locking component can be driven by pivoting movement of the pivoting component to slide relative to the driving slot to disengage from the other of the base and the seat body to allow switching movement of the seat body relative to the base.

20 Claims, 9 Drawing Sheets

(56) References Cited

U.S. PATENT DOCUMENTS

| | | | |
|---|---|---|---|
| 7,322,648 B2 | 1/2008 | Nakagawa | |
| 7,338,122 B2 | 3/2008 | Hei | |
| 7,357,451 B2 | 4/2008 | Bendure | |
| 7,481,492 B2 | 1/2009 | Lhomme | |
| 7,533,935 B2 | 5/2009 | Mostert | |
| 7,575,276 B1 | 8/2009 | Henry | |
| 8,651,572 B2 | 2/2014 | Medeiros | |
| 9,061,611 B2 | 6/2015 | Love | |
| 9,090,182 B2 | 7/2015 | Rabeony | |
| 9,415,706 B2 | 8/2016 | Rabeony | |
| 9,434,279 B2 | 9/2016 | Williams | |
| 10,150,389 B2 | 12/2018 | Cohen | |
| 10,322,651 B2 | 6/2019 | Hutchinson | |
| 10,457,168 B2 | 10/2019 | Anderson | |
| 10,688,892 B2 | 6/2020 | Anderson | |
| 10,780,800 B2 | 9/2020 | Kaiser | |
| 2002/0043836 A1 | 4/2002 | Maciejczyk | |
| 2002/0145319 A1* | 10/2002 | Tsugimatsu | B60N 2/2875 297/256.13 |
| 2005/0236877 A1* | 10/2005 | Hendren | B60N 2/2869 297/250.1 |
| 2008/0296944 A1 | 12/2008 | Nakagawa et al. | |
| 2009/0091167 A1 | 4/2009 | Jha | |
| 2011/0109138 A1 | 5/2011 | Inoue | |
| 2014/0265255 A1 | 9/2014 | Wang | |
| 2014/0284977 A1 | 9/2014 | Williams | |
| 2015/0336481 A1 | 11/2015 | Horsfall | |
| 2016/0332542 A1 | 11/2016 | Cohen | |
| 2018/0022241 A1 | 1/2018 | Jewkes | |
| 2018/0264977 A1 | 9/2018 | Anderson | |
| 2018/0361889 A1 | 12/2018 | Stamper | |
| 2019/0135142 A1* | 5/2019 | Jung | B60N 2/2821 |
| 2020/0215941 A1* | 7/2020 | Resch | B60N 2/2875 |
| 2020/0391627 A1 | 12/2020 | Williams | |

FOREIGN PATENT DOCUMENTS

| | | |
|---|---|---|
| CA | 3083394 A1 | 12/2020 |
| CN | 201124777 Y | 10/2008 |
| CN | 103661023 A | 3/2014 |
| CN | 204623214 U | 9/2015 |
| CN | 106671836 A | 5/2017 |
| CN | 107499195 A | 12/2017 |
| CN | 107585065 A | 1/2018 |
| CN | 112078450 A | 12/2020 |
| DE | 602 12 485 T2 | 6/2007 |
| DE | 20 2014 011 356 U1 | 9/2019 |
| DE | 10 2020 115 441 A1 | 12/2020 |
| EP | 1 772 307 B1 | 5/2012 |
| EP | 2 586 651 A1 | 5/2013 |
| EP | 2 612 793 A2 | 7/2013 |
| EP | 3 511 202 A1 | 7/2019 |
| EP | 3 521 105 A1 | 8/2019 |
| GB | 2587067 A | 3/2021 |
| JP | 2007-168580 A | 7/2007 |
| WO | 2007/121277 A2 | 10/2007 |
| WO | 2013/082321 A1 | 6/2013 |
| WO | 2014/000014 A1 | 1/2014 |
| WO | 2016/183156 A1 | 11/2016 |

OTHER PUBLICATIONS

Office action dated Nov. 3, 2022 for U.S. Appl. No. 17/705,401, filed Mar. 28, 2022, pp. 1-20.

Office action dated Nov. 21, 2022 for GB application No. 2008778.9, pp. 1-3.

Office action dated Feb. 3, 2022 for CA application No. 3,083,385, pp. 1-4.

Office action dated Nov. 25, 2022 for CA application No. 3,083,385, pp. 1-4.

\* cited by examiner

CHILD SAFETY SEAT AND RELATED SPIN LOCK MECHANISM

CROSS REFERENCE TO RELATED APPLICATIONS

This is a continuation application of U.S. patent application Ser. No. 16/888,876, filed on Jun. 1, 2020, which claims the benefit of U.S. Provisional Application No. 62/860,398, filed on Jun. 12, 2019, and the entire contents of this application are hereby incorporated by reference.

BACKGROUND OF THE INVENTION

1. Field of the Invention

The present invention relates to a child product, and more particularly, to a child safety seat and a spin lock mechanism thereof.

2. Description of the Prior Art

With development of the economy and advancement of the technology, there are more and more consumer goods available in the market for bringing convenience in people's life. A child safety seat is one of the consumer goods for securing a child when traveling in a vehicle. Some child safety seats in the market offer an ability to rotate between a front-facing position and a rear-facing position. In order to position the child safety seat at the front-facing position or the rear-facing position, a spin lock mechanism is required to restrain or allow rotation of the child safety seat. However, the conventional spin lock mechanism has complicated structure, which is not convenient in use.

SUMMARY OF THE INVENTION

Therefore, it is an objective of the present invention to provide a child safety seat and a spin lock mechanism thereof for solving the aforementioned problem.

In order to achieve the aforementioned objective, the present invention discloses a child safety seat. The child safety seat includes a base, a seat body and a spin lock mechanism. The base is installed on a seat of a vehicle. The seat body is movably disposed on the base and for accommodating a child. The seat body is switchable relative to the base between a forward facing position and a rearward facing position. The spin lock mechanism is for allowing and restraining switching movement of the seat body relative to the base. The spin lock mechanism includes a pivoting component and a locking component. The pivoting component is pivotally connected to one of the base and the seat body. A driving slot is formed on the pivoting component. The locking component is movably connected to the pivoting component and slidably passes through the driving slot. The locking component is for engaging with and disengaging from another one of the base and the seat body. The pivoting component drives the locking component to slide relative to the driving slot to switch from a locking position to a releasing position when the pivoting component pivots. The locking component engages with the another one of the base and the seat body for restraining the switching movement of the seat body relative to the base when the locking component is located at the locking position, and the locking component disengages from the another one of the base and the seat body for allowing the switching movement of the seat body relative to the base when the locking component is located at the releasing position.

According to an embodiment of the present invention, the spin lock mechanism further includes an operating component and at least one linking component. The at least one linking component is connected to the operating component and the pivoting component, and the operating component drives the pivoting component to pivot by the at least one linking component when the operating component is operated.

According to an embodiment of the present invention, the spin lock mechanism further includes a resilient component for biasing the locking component to move toward the locking position.

According to an embodiment of the present invention, the spin lock mechanism further includes an operating component coupled to the pivoting component for driving the pivoting component to pivot when the operating component is operated. The pivoting component includes a first portion and a second portion. The first portion extends along a first direction. The second portion extends along a second direction different from the first direction. The first portion is pivotally connected to the one of the base and the seat body. The driving slot is formed on the second portion. The second portion of the pivoting component drives the locking component to slide relative to the driving slot to switch from the locking position to the releasing position when the pivoting component pivots.

According to an embodiment of the present invention, the first direction is perpendicular to the second direction.

According to an embodiment of the present invention, the spin lock mechanism further includes a pin and a washer. The locking component includes a first end and a second end opposite to the first end. The first end and the second end are located at two sides of the second portion. A through hole is formed on the first end. The pin passes through the through hole. The washer is disposed between the pin and the second portion, and the second portion of the pivoting component drives the locking component to switch from the locking position to the releasing position by abutment of the washer and the pin when the pivoting component pivots.

According to an embodiment of the present invention, the locking component further includes a protruding rim adjacent to the second end, and the spin lock mechanism further includes a resilient component abutting against the protruding rim for biasing the locking component to move toward the locking position.

According to an embodiment of the present invention, the pivoting component further includes a pivoting shaft rotatably engaging with the one of the base and the seat body.

According to an embodiment of the present invention, the spin lock mechanism further includes an operating component and at least one linking component. The at least one linking component is connected to the operating component and the pivoting component, and the operating component drives the pivoting component to pivot around the pivoting shaft by the at least one linking component when the operating component is operated.

According to an embodiment of the present invention, the spin lock mechanism further includes a resilient component for biasing the locking component to move toward the locking position.

In order to achieve the aforementioned objective, the present invention further discloses a spin lock mechanism for allowing and restraining switching movement of a seat body relative to a base between a forward facing position and a rearward facing position. The spin lock mechanism includes a pivoting component and a locking component. The pivoting component is pivotally connected to one of the base and the seat body. A driving slot is formed on the pivoting component. The locking component is movably connected to the pivoting component and slidably passes through the driving slot. The locking component is for engaging with and disengaging from another one of the base and the seat body. The pivoting component drives the locking component to slide relative to the driving slot to switch from a locking position to a releasing position when the pivoting component pivots. The locking component engages with the another one of the base and the seat body for restraining the switching movement of the seat body relative to the base when the locking component is located at the locking position, and the locking component disengages from the another one of the base and the seat body for allowing the switching movement of the seat body relative to the base when the locking component is located at the releasing position.

According to an embodiment of the present invention, the spin lock mechanism further includes an operating component and at least one linking component. The at least one linking component is connected to the operating component and the pivoting component, and the operating component drives the pivoting component to pivot by the at least one linking component when the operating component is operated.

According to an embodiment of the present invention, the spin lock mechanism further includes a resilient component for biasing the locking component to move toward the locking position.

According to an embodiment of the present invention, the spin lock mechanism further includes an operating component coupled to the pivoting component for driving the pivoting component to pivot when the operating component is operated. The pivoting component includes a first portion and a second portion. The first portion extends along a first direction. The second portion extends along a second direction different from the first direction. The first portion is pivotally connected to the one of the base and the seat body. The driving slot is formed on the second portion. The second portion of the pivoting component drives the locking component to slide relative to the driving slot to switch from the locking position to the releasing position when the pivoting component pivots.

According to an embodiment of the present invention, the first direction is perpendicular to the second direction.

According to an embodiment of the present invention, the spin lock mechanism further includes a pin and a washer. The locking component includes a first end and a second end opposite to the first end. The first end and the second end are located at two sides of the second portion. A through hole is formed on the first end. The pin passes through the through hole. The washer is disposed between the pin and the second portion, and the second portion of the pivoting component drives the locking component to switch from the locking position to the releasing position by abutment of the washer and the pin when the pivoting component pivots.

According to an embodiment of the present invention, the locking component further includes a protruding rim adjacent to the second end, and the spin lock mechanism further includes a resilient component abutting against the protruding rim for biasing the locking component to move toward the locking position.

According to an embodiment of the present invention, the pivoting component further includes a pivoting shaft rotatably engaging with the one of the base and the seat body.

According to an embodiment of the present invention, the spin lock mechanism further includes an operating component and at least one linking component. The at least one linking component is connected to the operating component and the pivoting component, and the operating component drives the pivoting component to pivot around the pivoting shaft by the at least one linking component when the operating component is operated.

According to an embodiment of the present invention, the spin lock mechanism further includes a resilient component for biasing the locking component to move toward the locking position.

In summary, in the present invention, when the pivoting component pivots, the pivoting component drives the locking component to disengage the seat body from the base for allowing switching movement of the seat body relative to the base between the forward facing position and the rearward facing position. Furthermore, the switching movement of the seat body relative to the base can be restrained by engagement of the seat body and the base with the locking component. Therefore, the present invention has advantages of simple structure and easy operation.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 1:
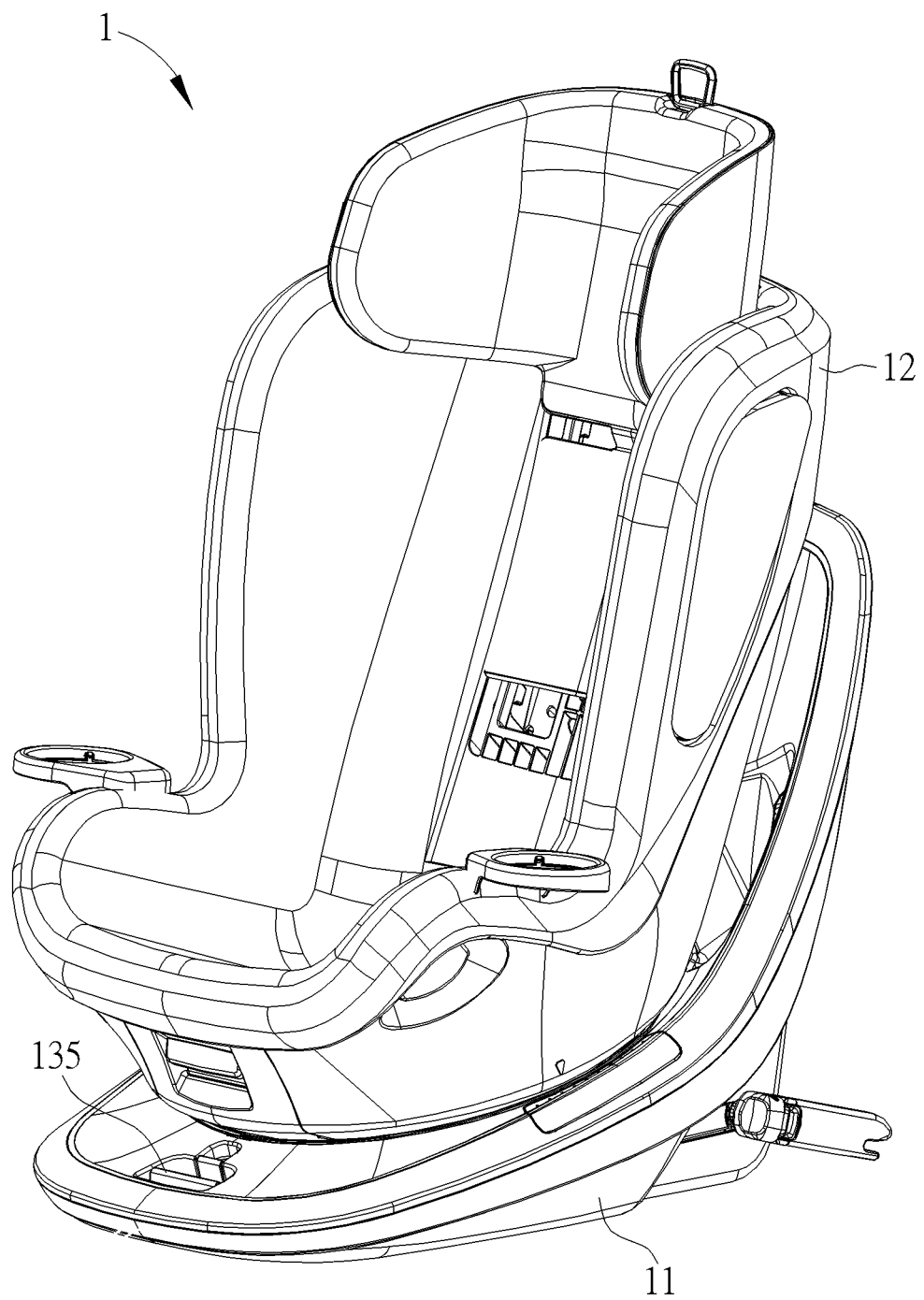
FIG. 1 is a schematic diagram of a child safety seat according to a first embodiment of the present invention.
Figure 2:
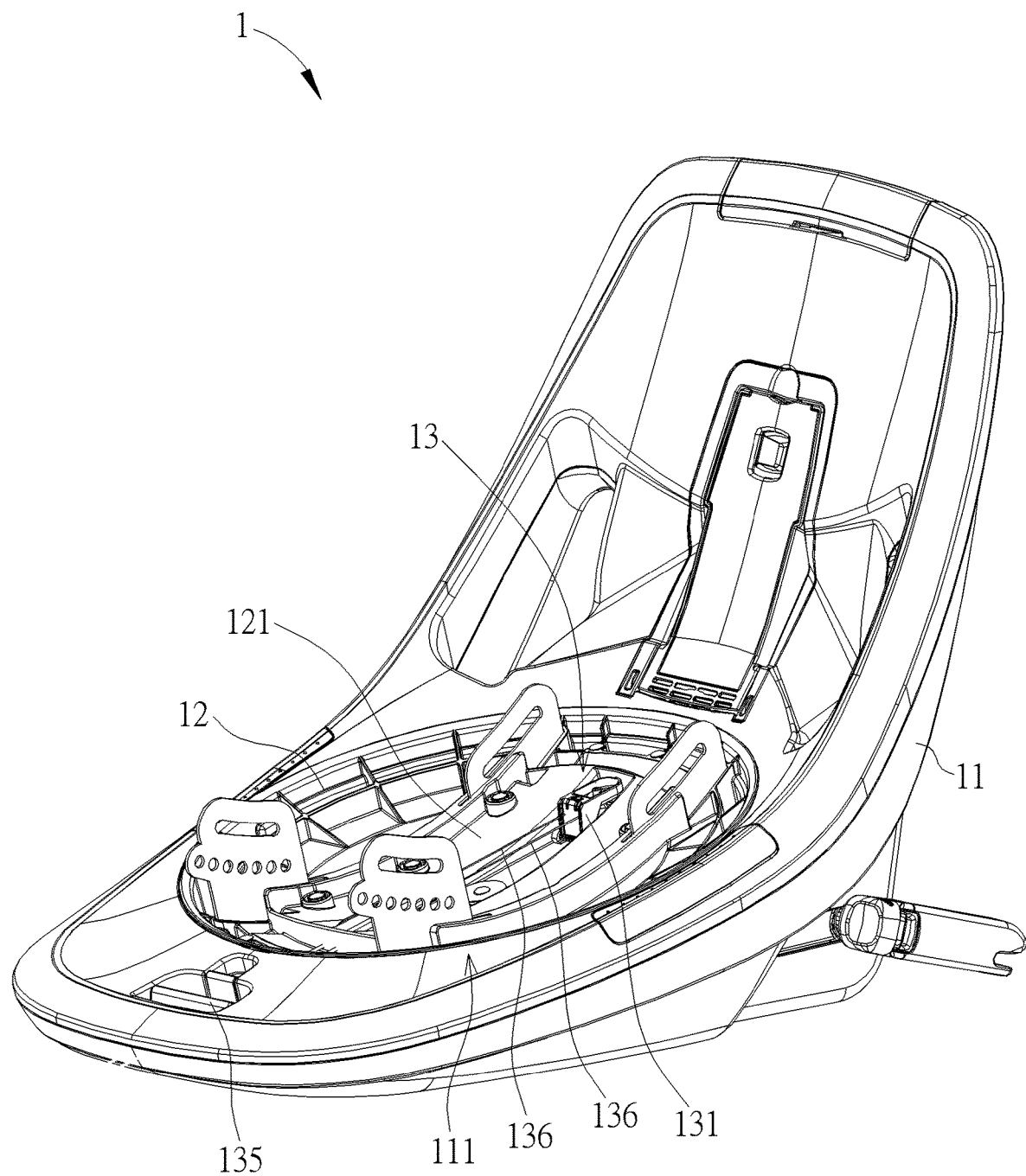
FIG. 2 is a partial diagram of the child safety seat according to the first embodiment of the present invention.
Figure 3:
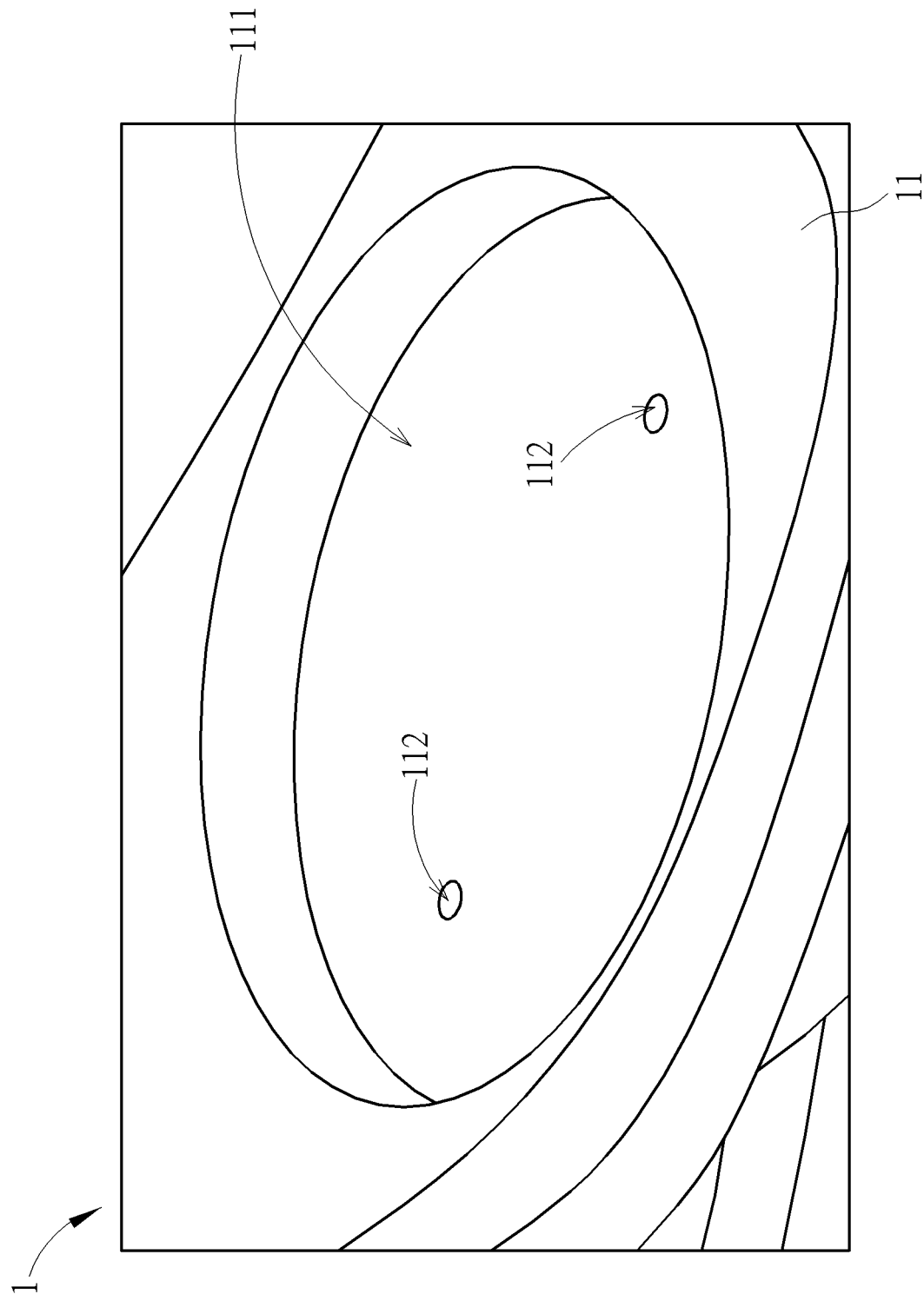
FIG. 3 is another partial diagram of the child safety seat according to the first embodiment of the present invention.
Figure 4:
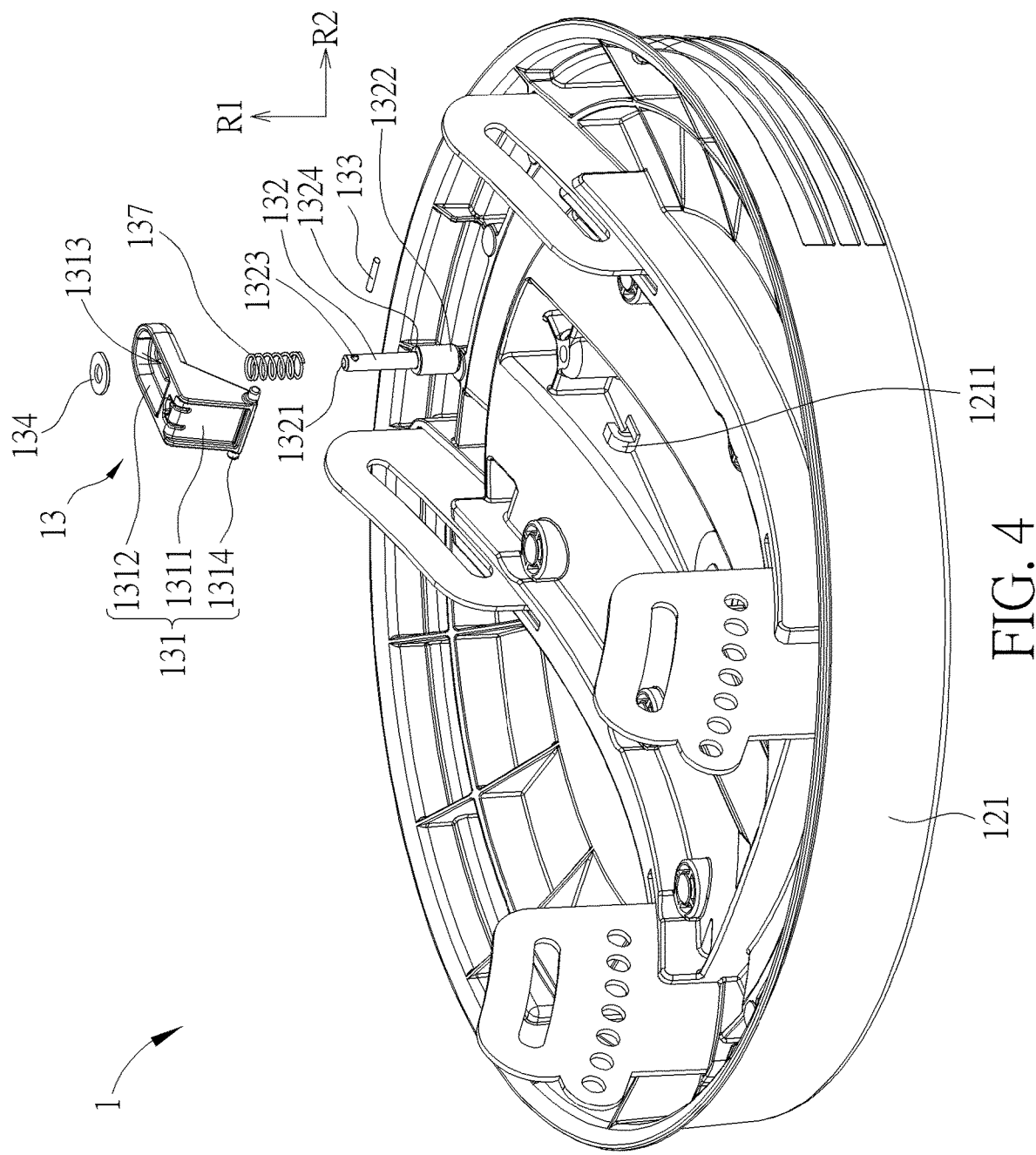
FIG. 4 is a partial exploded diagram of the child safety seat according to the first embodiment of the present invention.
Figure 5:
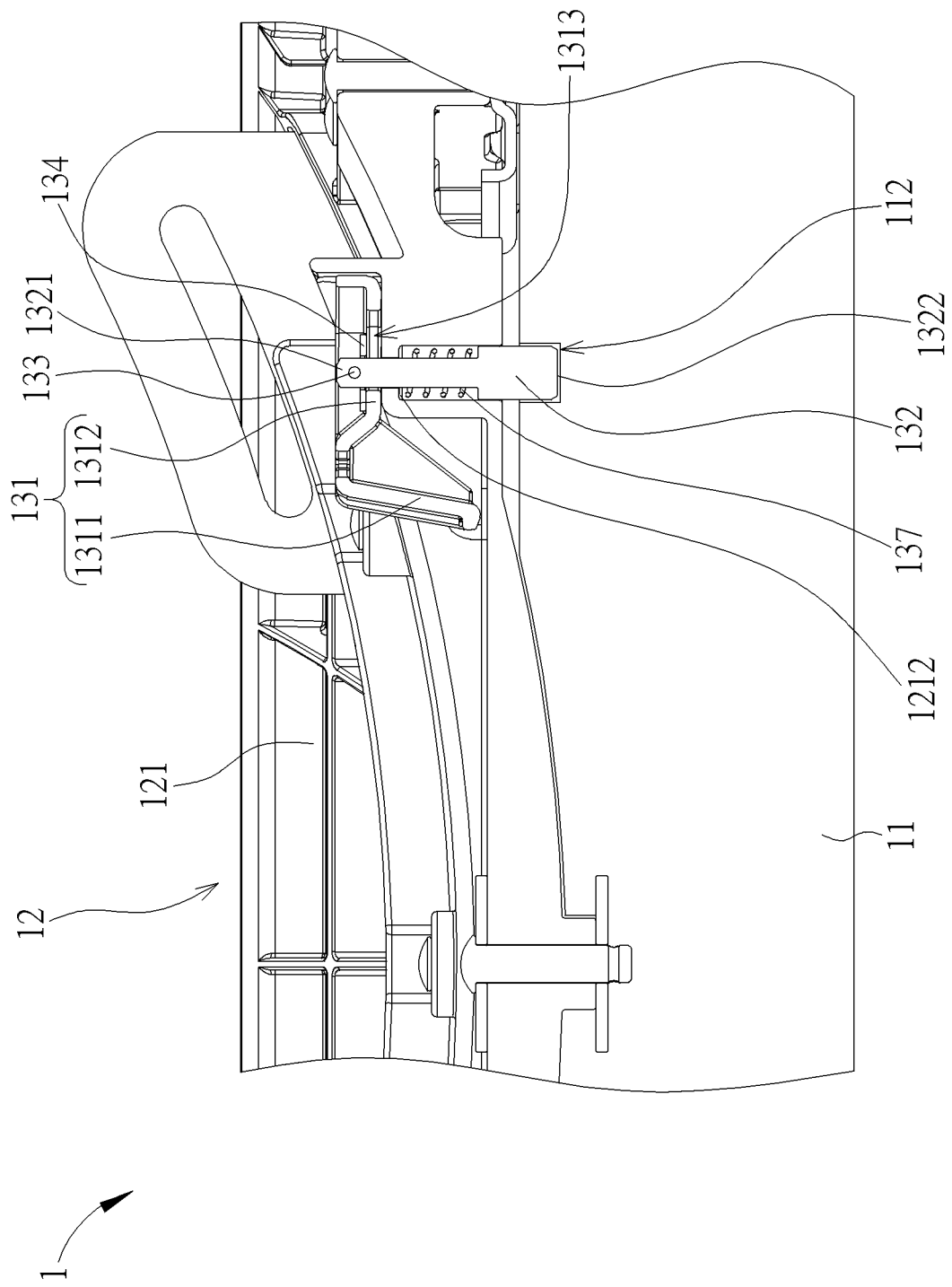
FIG. 5 is a partial sectional diagram of the child safety seat according to the first embodiment of the present invention.

Please refer to FIG. 1 to FIG. 5. FIG. 1 is a schematic diagram of a child safety seat 1 according to a first embodiment of the present invention. FIG. 2 is a partial diagram of the child safety seat 1 according to the first embodiment of the present invention. FIG. 3 is another partial diagram of the child safety seat 1 according to the first embodiment of the present invention. FIG. 4 is a partial exploded diagram of the child safety seat 1 according to the first embodiment of the present invention. FIG. 5 is a partial sectional diagram of the child safety seat 1 according to the first embodiment of the present invention. As shown in FIG. 1 to FIG. 5, the child safety seat 1 includes a base 11, a seat body 12 and a spin lock mechanism 13. The base 11 is installed on a seat of a vehicle, which is not shown in the figures. The seat body 12 is movably disposed on the base 11 and for accommodating a child. The seat body 12 is switchable relative to the base 11 between a forward facing position and a rearward facing position in a rotating manner. The spin lock mechanism 13 is for allowing and restraining switching movement, i.e., rotating movement, of the seat body 12 relative to the base 11.

The spin lock mechanism 13 includes a pivoting component 131 and a locking component 132. The pivoting component 131 is pivotally connected to a middle base 121 of the seat body 12, which is installed in an accommodating chamber 111 formed on the base 11 and rotatable relative to the base 11. The locking component 132 is movably connected to the pivoting component 131 and for engaging with or disengaging from the base 11. The pivoting component 131 drives the locking component 132 to switch from a locking position to a releasing position when the pivoting component 131 pivots. The locking component 132 engages with the base 11 for restraining the switching movement of the seat body 12 relative to the base 11 when the locking component 132 is located at the locking position, and the locking component 132 disengages from the base 11 for allowing the switching movement of the seat body 12 relative to the base 11 when the locking component 132 is located at the releasing position.

Specifically, in this embodiment, the pivoting component 131 includes a first portion 1311 and a second portion 1312 connected to the first portion 1311. The first portion 1311 extends along a first direction R1, and the second portion 1312 extends along a second direction R2 different from the first direction. The first portion 1311 is pivotally connected to the middle base 121 of the seat body 12. A driving slot 1313 is formed on the second portion 1312. The locking component 132 slidably passes through the driving slot 1313, and the second portion 1312 of the pivoting component 131 drives the locking component 132 to slide relative to the driving slot 1313 to switch from the locking position to the releasing position when the pivoting component 131 pivots. Preferably, in this embodiment, the first direction R1 can be perpendicular to the second direction R2, and the pivoting component 131 can further include a pivoting shaft 1314 disposed on the first portion 1311 away from a connection of the first portion 1311 and the second portion 1312, and the pivoting shaft 1314 rotatably engages with at least one pivoting notch 1211 formed the middle base 121 of the seat body 12. However, the present invention is not limited to this embodiment. For example, in another embodiment, the first direction also can intersect with the second direction, and the pivoting shaft and the pivoting notch can be respectively disposed on the middle base of the seat body and the first portion of the pivoting component. Alternatively, in another embodiment, the pivoting component can be pivoted to the base by the pivoting shaft, and the locking component can be configured to engage with or disengage from the seat body.

Furthermore, the spin lock mechanism 13 further includes a pin 133 and a washer 134. The locking component 132 includes a first end 1321 and a second end 1322 opposite to the first end 132. The first end 1321 and the second end 1322 are located at two sides of the second portion 1312 when the locking component 132 passes through the driving slot 1313. A through hole 1323 is formed on the first end 1321. The pin 133 passes through the through hole 1323. The washer 134 is disposed between the pin 133 and the second portion 1312, and the second portion 1312 of the pivoting component 131 drives the locking component 132 to switch from the locking position to the releasing position by abutment of the washer 134 and the pin 133 when the pivoting component 131 pivots. However, the present invention is not limited to this embodiment. For example, in another embodiment, two protruding portions, e.g. flanges or nuts, can be disposed on the locking component and spaced apart from each other, and the locking component slidably passes through the driving slot to locate the second portion between the two protruding portions, so that the pivoting component can drive the locking component to switch from the locking position to the releasing by abutment of the second portion and the upper protruding portion when the pivoting component pivots along a first pivoting direction, or switch from the releasing position to the locking position by abutment of the second portion and the lower protruding portion when the pivoting component pivots along a second pivoting direction opposite to the first pivoting direction.

In order to position the seat body 12 relative to the base 11 at the forward facing position and the rearward facing position by engagement of the locking component 132 and the base 11, two positioning slots 112 are formed on the base 11 and symmetrical to each other relative to a rotating axis of the seat body 12. The locking component 132 is aligned with one of the two positioning slots 112 when the seat body 12 is located at the forward facing position. The locking component 132 is aligned with the other one of the two positioning slots 112 when the seat body 12 is located at the rearward facing position.

Besides, the spin lock mechanism 13 further includes an operating component 135 and two linking components 136. The operating component 135 is disposed on the base 11. Preferably, the operating component 135 can be disposed on a front portion of the base 11. However, the present invention is not limited to this embodiment. In another embodiment, the operating component can be disposed on a lateral portion or a rear portion of the base. The two linking components 136 are connected to the operating component 135 and the pivoting component 131 and are parallel to each other, and the operating component 135 drives the pivoting component 131 to pivot by the two linking components 136 when the operating component 135 is operated. However, the present invention is not limited to this embodiment. For example, in another embodiment, the spin lock mechanism can include only one linking component connected between the operating component and the pivoting component. Alternatively, in another embodiment, the operating component and the linking component can be omitted, and the pivoting component can be partially exposed out of the seat body for a user to operate.

In order to recover the locking component 132 to the locking position, the locking component 132 further includes a protruding rim 1324 adjacent to the second end 1322, and the spin lock mechanism 13 further comprises a resilient component 137 abutting against the protruding rim 1324 for biasing the locking component 132 to move toward the locking position. Preferably, in this embodiment, the resilient component 137 can be a compression spring abutting against the protruding rim 1324 and a wall 1212 of the middle base 121 of the seat body 12. However, the present invention is not limited to this embodiment. For example, in another embodiment, the resilient component can be a torsional spring abutting against the pivoting component, so that the pivoting component can be driven by the resilient component to drive the locking component to move toward the locking position.

Figure 6:
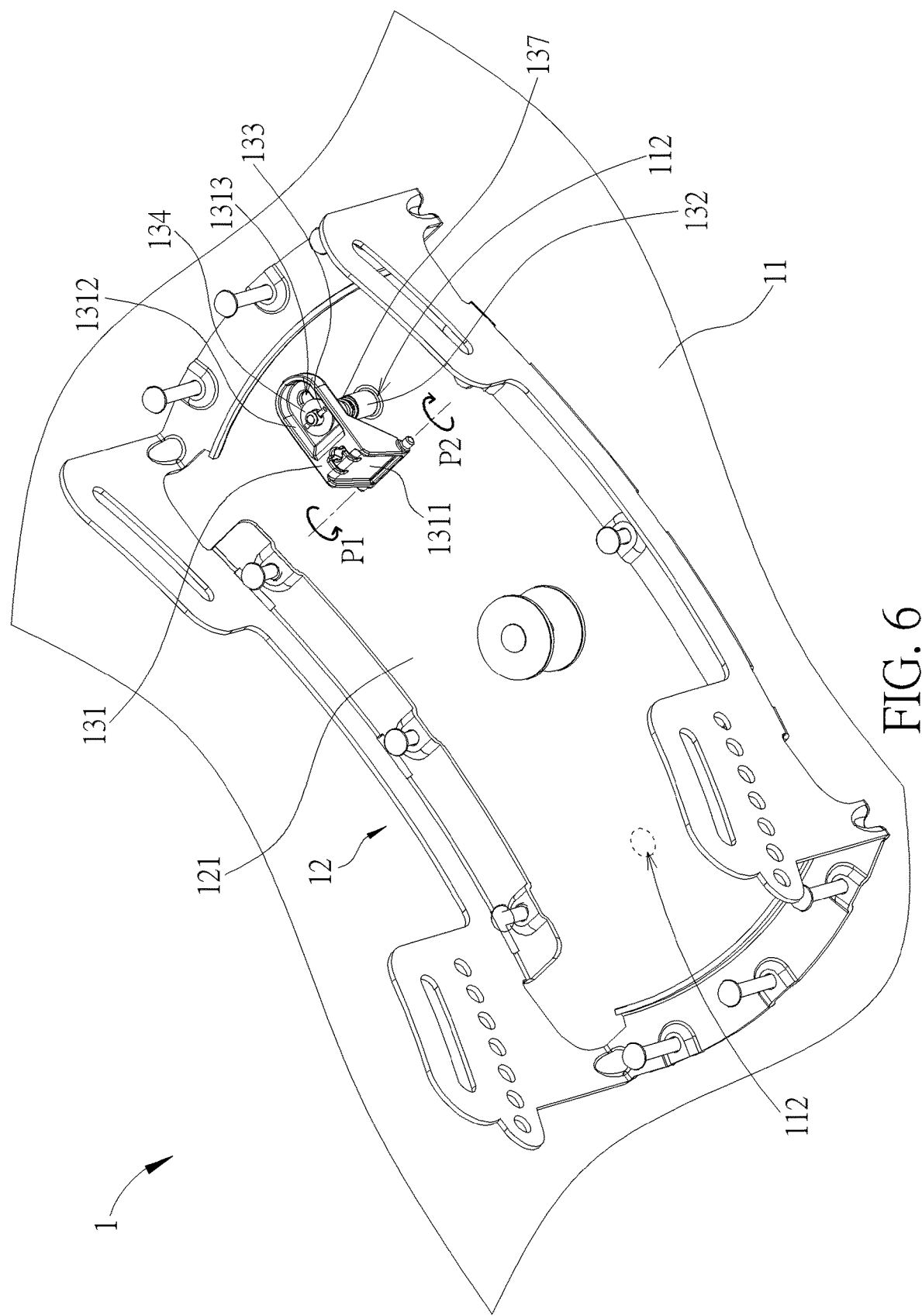
FIG. 6 and FIG. 7 are partial diagrams of the child safety seat at different states according to the first embodiment of the present invention.
Figure 7:
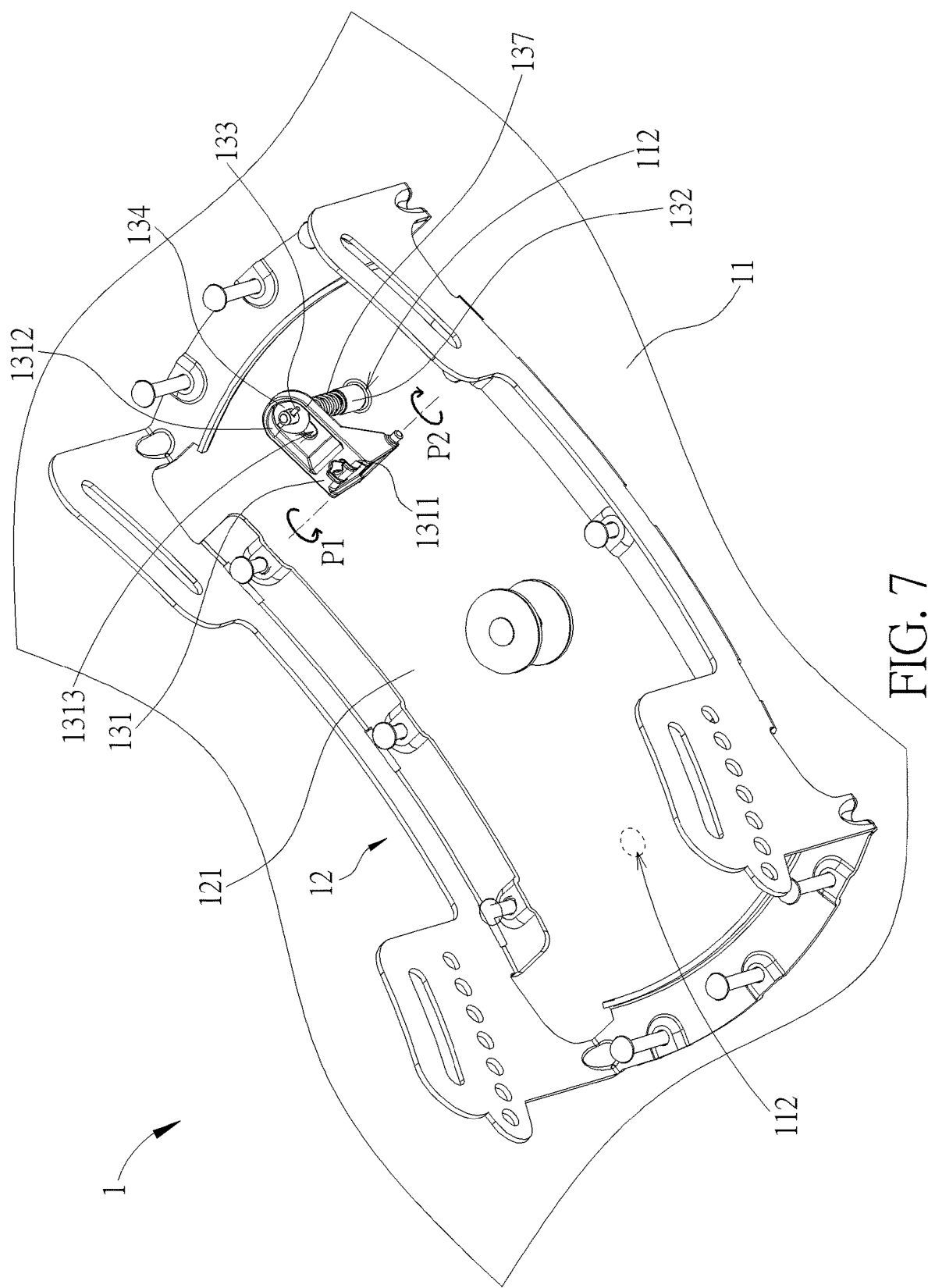

Please refer to FIG. 1, FIG. 2, FIG. 6 and FIG. 7. FIG. 6 and FIG. 7 are partial diagrams of the child safety seat 1 at different states according to the first embodiment of the present invention. As shown in FIG. 1, FIG. 2, FIG. 6 and FIG. 7, when it is desired to switch the seat body 12 relative to the base 11 between the forward facing position as shown in FIG. 1, and the rearward facing position, the operating component 135 can be operated to drive the pivoting component 131 to pivot by the two linking components 136. When the pivoting component 131 is driven to pivot along a first pivoting direction P1, the second portion 1312 of the pivoting component 131 drives the locking component 132 upwardly by the abutment of the washer 134 and the pin 133 to move from the locking position as shown in FIG. 6 to the releasing position as shown in FIG. 7. When the locking component 132 moves from the locking position to the releasing position, the locking component 132 leaves from an end of the driving slot 1313 adjacent to the first portion 1311 of the pivoting component 131 toward another end of the driving slot 1313 away from the first portion 1311 of the pivoting component 131, and the locking component 132 is lifted by the second portion 1312 of the pivoting component 131 to disengage from the corresponding positioning slot 112 due to pivoting movement of the pivoting component 131 along the first pivoting direction P1 for allowing the switching movement of the seat body 12 relative to the base 11. At this moment, the resilient component 137 is resiliently deformed by the locking component 132. Since the switching movement of the seat body 12 relative to the base 11 is allowed by disengagement of the locking component 132 and the corresponding positioning slot 112, the seat body 12 can rotate relative to the base 11 from the forward facing position as shown in FIG. 1 to the rearward facing position or from the rearward facing position to the forward facing position as shown in FIG. 1.

After the switching movement of the seat body 12 is completed, the operating component 135 can be released, so that the resiliently deformed resilient component 137 can drive the locking component 132 downwardly to move from the releasing position as shown in FIG. 7 to the locking position as shown in FIG. 6 for restraining the switching movement of the seat body 12 relative to the base 11, and the locking component drives the pivoting component to pivot along a second pivoting direction P2 opposite to the first pivoting direction P1 by the abutment of the pin 133 and the washer 134. At this moment, since the switching movement of the seat body 12 relative to the base 11 is restrained by engagement of the locking component 132 and the corresponding positioning slot 112, the seat body 12 can be positioned at the forward facing position or the rearward facing position.

Figure 8:
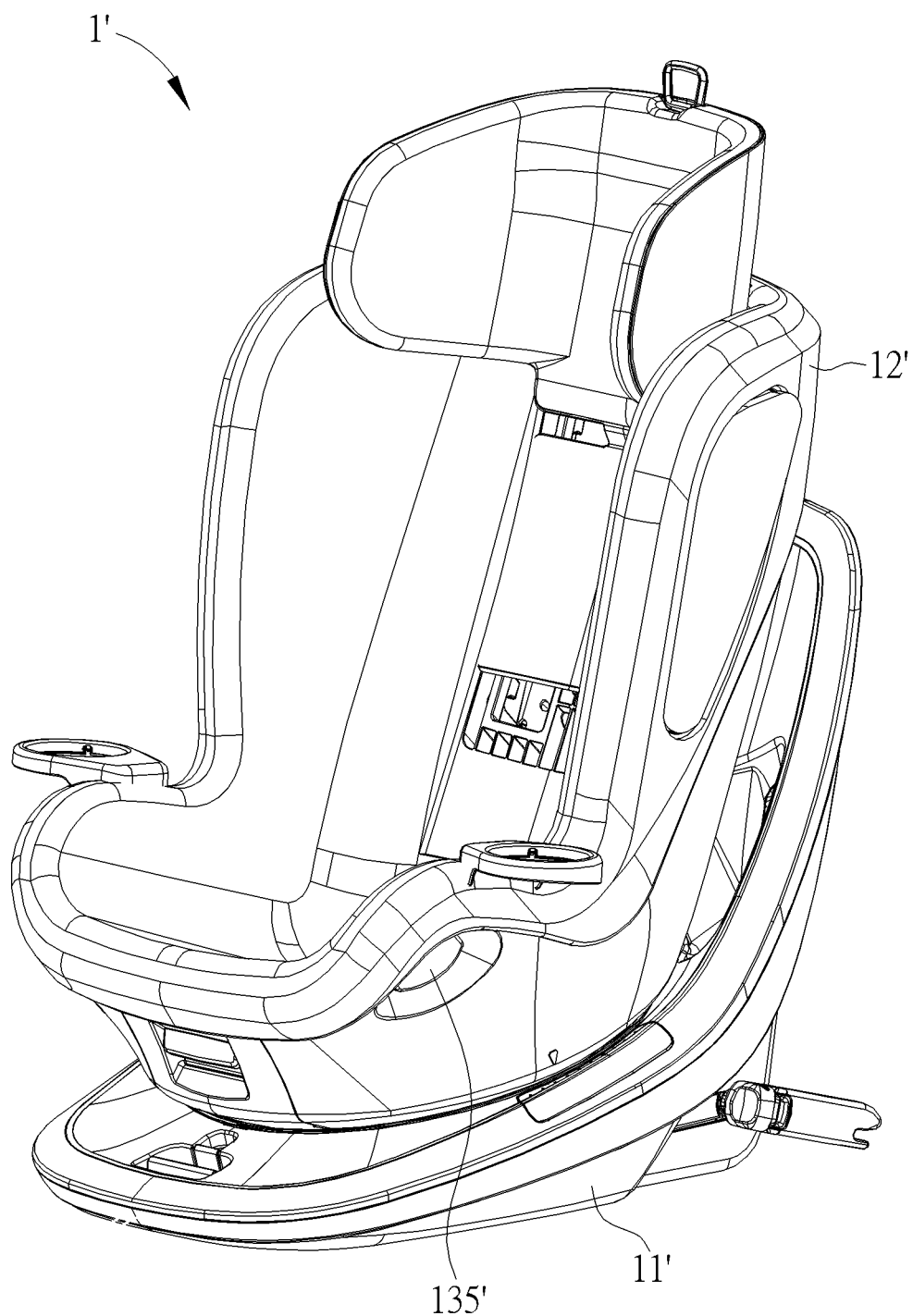
FIG. 8 is a schematic diagram of a child safety seat according to a second embodiment of the present invention.
Figure 9:
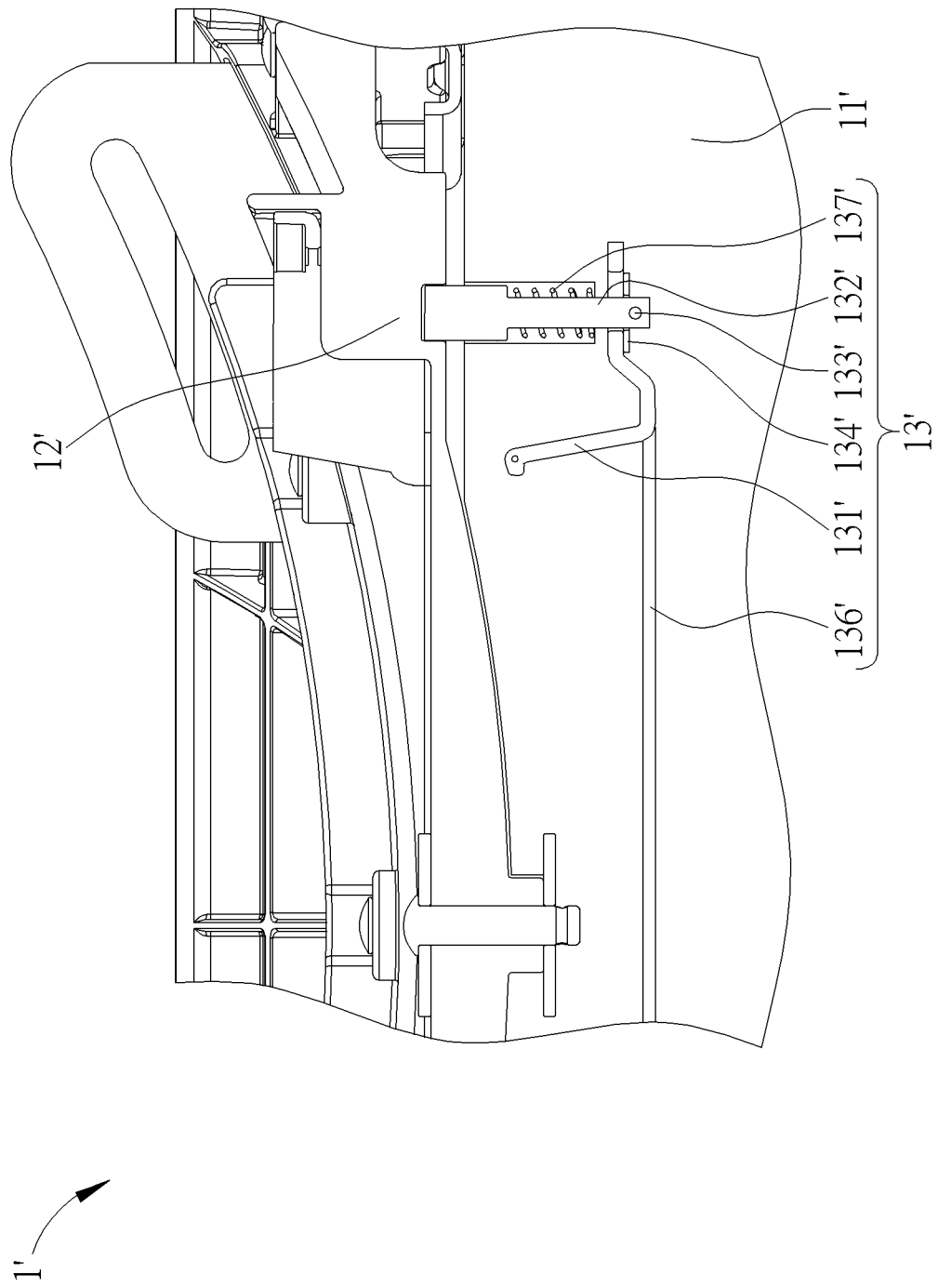
FIG. 9 is a partial section diagram of the child safety seat according to the second embodiment of the present invention.

Please refer to FIG. 8 and FIG. 9. FIG. 8 is a schematic diagram of a child safety seat 1' according to a second embodiment of the present invention. FIG. 9 is a partial section diagram of the child safety seat 1' according to the second embodiment of the present invention. As shown in FIG. 8, different from the first embodiment, the child safety seat 1' includes a base 11', a seat body 12' and a spin lock mechanism 13'. The spin lock mechanism 13' includes a pivoting component 131', a locking component 132', a pin 133', a washer 134', an operating component 135', a linking component 136' and a resilient component 137'. The pivoting component 131' is pivotally connected to the base 11' instead of the seat body 12', and the locking component 132' is slidably connected to the pivoting component 131' by the pin 133' and the washer 134' for engaging with or disengaging from the seat body 12' instead of the base 11'. The operating component 135' is disposed on the seat body 12'. Preferably, the operating component 135' can be disposed on a lateral portion of the seat body 12'. However, the present invention is not limited to this embodiment. In another embodiment, the operating component can be disposed on a front portion or a rear portion of the seat body. The linking component 136' is connected between the operating component 135' and the pivoting component. The resilient component 137' abuts between the locking component 132' and the base 11'. Other structures of this embodiment are similar to the ones of the first embodiment. Detailed description for those structures is omitted herein for simplicity. When the operating component 135' is operated to drive the pivoting component 131' to pivot by the linking component 136', the pivoting component 131' drives the locking component 132' to disengage from the seat body 12' for allowing switching movement of the seat body 12' relative to the base 11'. When the operating component 135' is released, the locking component 132' is recovered by the resilient component 137' to engage with the seat body 12' for restraining the switching movement of the seat body 12' relative to the base 11'.

In contrast to the prior art, in the present invention, when the pivoting component pivots, the pivoting component drives the locking component to disengage the seat body from the base for allowing switching movement of the seat body relative to the base between the forward facing position and the rearward facing position. Furthermore, the switching movement of the seat body relative to the base can be restrained by engagement of the seat body and the base with the locking component. Therefore, the present invention has advantages of simple structure and easy operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A child safety seat comprising:
 a base installed on a seat of a vehicle;
 a seat body movably disposed on the base and for accommodating a child, the seat body being switchable relative to the base between a forward facing position and a rearward facing position; and
 a spin lock mechanism for allowing and restraining switching movement of the seat body relative to the base, the spin lock mechanism comprising:

a pivoting component pivotally connected to one of the base and the seat body, a driving slot being formed on the pivoting component; and a locking component movably connected to the pivoting component and slidably passing through the driving slot along a direction parallel to an engaging direction and a disengaging direction of the locking component, the locking component being for engaging with and disengaging from another one of the base and the seat body;

wherein the pivoting component drives the locking component to slide relative to the driving slot to switch from a locking position to a releasing position when the pivoting component pivots, the locking component engages with the another one of the base and the seat body for restraining the switching movement of the seat body relative to the base when the locking component is located at the locking position, and the locking component disengages from the another one of the base and the seat body for allowing the switching movement of the seat body relative to the base when the locking component is located at the releasing position.

2. The child safety seat of claim 1, wherein the spin lock mechanism further comprises an operating component and at least one linking component, the at least one linking component is connected to the operating component and the pivoting component, and the operating component drives the pivoting component to pivot by the at least one linking component when the operating component is operated.

3. The child safety seat of claim 2, wherein the spin lock mechanism further comprises a resilient component for biasing the locking component to move toward the locking position.

4. The child safety seat of claim 1, wherein the spin lock mechanism further comprises an operating component coupled to the pivoting component for driving the pivoting component to pivot when the operating component is operated, the pivoting component comprises a first portion and a second portion, the first portion extends along a first direction, the second portion extends along a second direction different from the first direction, the first portion is pivotally connected to the one of the base and the seat body, the driving slot is formed on the second portion, and the second portion of the pivoting component drives the locking component to slide relative to the driving slot to switch from the locking position to the releasing position when the pivoting component pivots.

5. The child safety seat of claim 4, wherein the first direction is perpendicular to the second direction.

6. The child safety seat of claim 4, wherein the spin lock mechanism further comprises a pin and a washer, the locking component comprises a first end and a second end opposite to the first end, the first end and the second end are located at two sides of the second portion, a through hole is formed on the first end, the pin passes through the through hole, the washer is disposed between the pin and the second portion, and the second portion of the pivoting component drives the locking component to switch from the locking position to the releasing position by abutment of the washer and the pin when the pivoting component pivots.

7. The child safety seat of claim 6, wherein the locking component further comprises a protruding rim adjacent to the second end, and the spin lock mechanism further comprises a resilient component abutting against the protruding rim for biasing the locking component to move toward the locking position.

8. The child safety seat of claim 1, wherein the pivoting component further comprises a pivoting shaft rotatably engaging with the one of the base and the seat body.

9. The child safety seat of claim 8, wherein the spin lock mechanism further comprises an operating component and at least one linking component, the at least one linking component is connected to the operating component and the pivoting component, and the operating component drives the pivoting component to pivot around the pivoting shaft by the at least one linking component when the operating component is operated.

10. The child safety seat of claim 1, wherein the spin lock mechanism further comprises a resilient component for biasing the locking component to move toward the locking position.

11. A spin lock mechanism for allowing and restraining switching movement of a seat body relative to a base between a forward facing position and a rearward facing position, the spin lock mechanism comprising:

a pivoting component pivotally connected to one of the base and the seat body, a driving slot being formed on the pivoting component; and a locking component movably connected to the pivoting component and slidably passing through the driving slot along a direction parallel to an engaging direction and a disengaging direction of the locking component, the locking component being for engaging with and disengaging from another one of the base and the seat body;

wherein the pivoting component drives the locking component to slide relative to the driving slot to switch from a locking position to a releasing position when the pivoting component pivots, the locking component engages with the another one of the base and the seat body for restraining the switching movement of the seat body relative to the base when the locking component is located at the locking position, and the locking component disengages from the another one of the base and the seat body for allowing the switching movement of the seat body relative to the base when the locking component is located at the releasing position.

12. The spin lock mechanism of claim 11, wherein the spin lock mechanism further comprises an operating component and at least one linking component, the at least one linking component is connected to the operating component and the pivoting component, and the operating component drives the pivoting component to pivot by the at least one linking component when the operating component is operated.

13. The spin lock mechanism of claim 12, wherein the spin lock mechanism further comprises a resilient component for biasing the locking component to move toward the locking position.

14. The spin lock mechanism of claim 11, wherein the spin lock mechanism further comprises an operating component coupled to the pivoting component for driving the pivoting component to pivot when the operating component is operated, the pivoting component comprises a first portion and a second portion, the first portion extends along a first direction, the second portion extends along a second direction different from the first direction, the first portion is pivotally connected to the one of the base and the seat body, the driving slot is formed on the second portion, and the second portion of the pivoting component drives the locking component to slide relative to the driving slot to switch from the locking position to the releasing position when the pivoting component pivots.

15. The spin lock mechanism of claim 14, wherein the first direction is perpendicular to the second direction.

16. The spin lock mechanism of claim 14, wherein the spin lock mechanism further comprises a pin and a washer, the locking component comprises a first end and a second end opposite to the first end, the first end and the second end are located at two sides of the second portion, a through hole is formed on the first end, the pin passes through the through hole, the washer is disposed between the pin and the second portion, and the second portion of the pivoting component drives the locking component to switch from the locking position to the releasing position by abutment of the washer and the pin when the pivoting component pivots.

17. The spin lock mechanism of claim 16, wherein the locking component further comprises a protruding rim adjacent to the second end, and the spin lock mechanism further comprises a resilient component abutting against the protruding rim for biasing the locking component to move toward the locking position.

18. The spin lock mechanism of claim 11, wherein the pivoting component further comprises a pivoting shaft rotatably engaging with the one of the base and the seat body.

19. The spin lock mechanism of claim 18, wherein the spin lock mechanism further comprises an operating component and at least one linking component, the at least one linking component is connected to the operating component and the pivoting component, and the operating component drives the pivoting component to pivot around the pivoting shaft by the at least one linking component when the operating component is operated.

20. The spin lock mechanism of claim 11, wherein the spin lock mechanism further comprises a resilient component for biasing the locking component to move toward the locking position.

\* \* \* \* \*